United States Patent [19]

Anderson

[11] 4,300,333
[45] Nov. 17, 1981

[54] AUGER CONVEYOR FOR A CROP HARVESTER

[75] Inventor: Sidney E. Anderson, Geneseo, Ill.

[73] Assignee: Deere & Company, Moline, Ill.

[21] Appl. No.: 170,263

[22] Filed: Jul. 18, 1980

[51] Int. Cl.³ .............................................. A01D 57/00
[52] U.S. Cl. .................................... 56/14.5; 198/666; 198/672
[58] Field of Search ....................... 56/14.3, 14.4, 14.5, 56/14.6; 198/666, 671, 670, 672

[56] References Cited

U.S. PATENT DOCUMENTS

| | | | |
|---|---|---|---|
| 3,072,243 | 1/1963 | Davis | 198/666 |
| 3,112,593 | 12/1963 | Ronning | 56/14.4 |
| 3,324,639 | 6/1967 | Halls et al. | 56/14.4 |
| 3,327,840 | 6/1967 | Wilkes | 198/672 |
| 3,977,164 | 8/1976 | Ashton | 56/14.5 |
| 4,216,641 | 8/1980 | Koch et al. | 56/14.4 |

FOREIGN PATENT DOCUMENTS

| | | | |
|---|---|---|---|
| 538449 | 3/1957 | Canada | 56/14.5 |
| 306126 | 8/1917 | Fed. Rep. of Germany | 198/672 |
| 2208498 | 9/1973 | Fed. Rep. of Germany | 56/14.3 |
| 2700725 | 7/1977 | Fed. Rep. of Germany | 198/672 |
| 6515523 | 5/1967 | Netherlands | 56/14.5 |

Primary Examiner—Paul J. Hirsch

[57] ABSTRACT

The cross auger of a corn head for a combine is made up of two independent identical but opposite-hand auger sections, each separately driven and with their inner ends sharing a common central suspension member. The inner end of each section includes a bearing plate which abuts its respective side of the suspension member and engages a pair of support ledges for support and location. A single fastener locks the two auger sections in position. A common central annular shield axially overlaps the inner ends of the tubes of both auger sections. An upper portion of the shield is easily removable to permit the inner end of either auger section to be lifted out of engagement with the support hanger without disturbing the remaining auger section.

20 Claims, 8 Drawing Figures

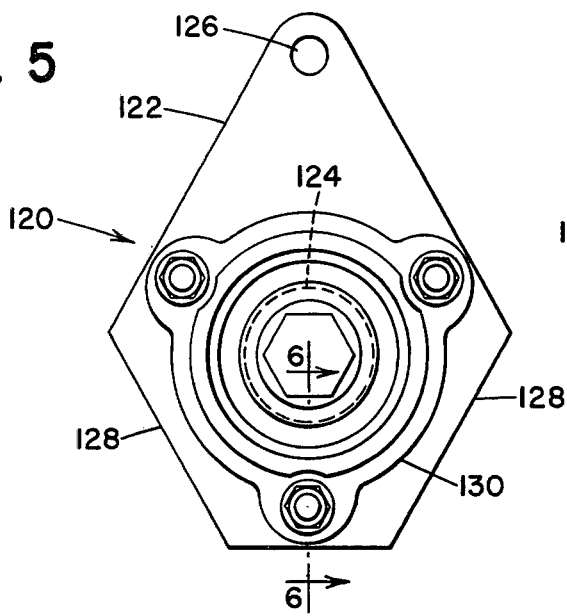
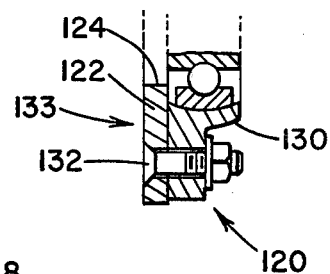
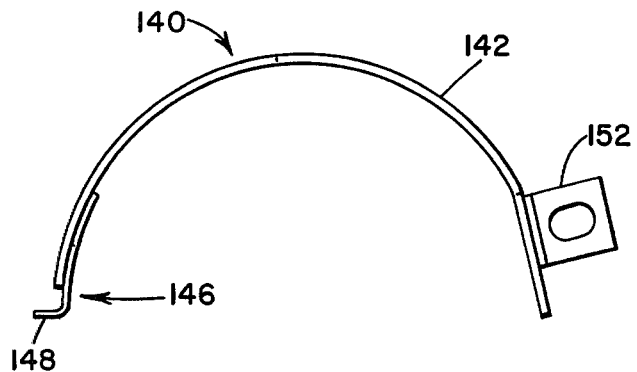
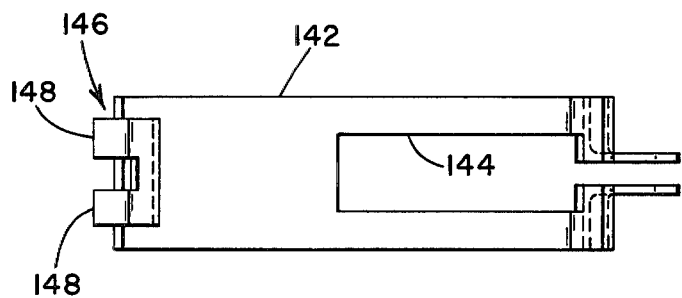

AUGER CONVEYOR FOR A CROP HARVESTER

BACKGROUND OF THE INVENTION

The present invention relates to an auger conveyor arrangement for a harvesting machine and particularly to one in which the conveyor auger is supported intermediately as well as adjacent its end. A particular application of the invention may be in a platform auger arrangement or cross auger of the header of a combine harvester.

As is well known, in combine headers the function of the cross conveyor is to receive crop material gathered from a field and converge it laterally for delivery to a feeder house, often situated at the center of the header, for transfer to a crop separating device in the main body of the combine. Pursuing the goals of increased harvesting efficiency and labor productivity, combines are built with ever bigger capacity separators, demanding a high crop material feed rate which is more easily satisfied by providing a wider header gatherer than by a higher combine forward speed. Combine header augers have generally been supported only at their opposite ends but in recent years, larger combines have been introduced with headers of such width that it becomes only marginally economic or practical to support a conveyor auger in this way. In the typical installation, the auger is most heavily loaded near its center where it delivers crop material to the feeder house and, if the auger itself is insufficiently stiff, deflection under load may result in contact between the auger and associated fixed conveying surfaces resulting in unacceptable wear and noise. A possible alternative, making an auger stiff enough by increasing its core tube diameter, may also be unacceptable because of the corresponding increase in flighting diameter required to maintain conveyor capacity and resulting increase in cost and weight.

It is already known to provide a central support in a combine harvester platform auger, see for example, U.S. Pat. No. 3,977,164, Ashton. However, the form of support disclosed by Ashton and that of intermediate supports for auger conveyors in general, tend to complicate assembly and disassembly of the individual auger sections. If adjacent auger portions are connected across the support, problems of alignment and the possibility of inducing undesirable stresses at the support area arise. Conventional intermediate support configurations often require the acceptance of an adverse effect on material handling adjacent the support because of the interruption in the conveying surfaces that they require.

SUMMARY OF THE INVENTION

Accordingly, it is an object of the invention to provide a simple compact support arrangement for the auger of an auger conveyor, which is particularly adaptable for use intermediate the conveyor ends and, in such applications, tolerant of misalignment between adjacent auger portions. A further objective is adaptability to independent drive of the separate portions, and to removal of a given auger portion from the conveyor assembly, conveniently and easily without disturbing a neighboring portion.

A feature of the invention is that, at least one end of an auger portion may include a support means for rotatably supporting that end and having a support or bearing plate in which the auger is journaled, the plate and associated bearing element being compactly designed and receivable against an upright support surface for vertical support. The support surface may carry raised ledge-like supports or sockets for engaging and locating the bearing plate and simple, possibly single, fastener means may be provided for locking the bearing plate in its supported position relative to the upright support surface. Preferably, the outer side of the bearing plate is flush, with the functional surfaces of the auger portion terminating vary close to that flush outer surface and, when used intermediate the ends of a conveyor, the upright support surface is provided by a thin suspension member generally perpendicular to the conveying axis of the auger conveyor. Thus, adjacent auger portions of the conveyor may be abutted and approximately aligned and rotated for conveyor operation with only a minimum interruption or discontinuity between the respective functional surfaces of the juxtaposed auger portions.

In a conveyor arrangement according to the invention, a pair of axially aligned auger portions may be locked in position on their opposite sides of a single suspension member or hanger by a single fastener passing through the suspension member and engaging both bearing plates. Preferably, the juxtaposed auger portions are completely independent of each other at the intermediate support and advantageously, are rotatably driven at their respective remote ends. With the very long conveyor augers of very wide platforms, it may easily be both convenient and advantageous to provide substantially independent drives for the respective auger portions rather than a single drive for both. Drives of relatively smaller proportions can then be used and the torque required to be transmitted through the conveyor auger itself is also reduced.

In keeping with the invention, a conveyor auger may have a single intermediate support approximately midway between opposite outer ends which are supported in the end walls of a header, the conveyor auger thus being in two independent portions, each driven by an input adjacent the outer end supports. The intermediate support is preferably adjacent that portion of the auger conveyor where the combined loading on the auger, due to gravity and conveying function, (typically adjacent a discharge into a feeder house) is greatest.

It is a feature of the invention that the bearing means at the intermediate auger support may include self-aligning bearings carried by a bearing plate so that the arrangement is tolerant of misalignment between the auger and the upright support surface and of course, of misalignment between the abutting auger portions themselves.

Another feature of the invention is that at the intermediate support the auger may be secured or locked in position by a single fastener, removal of which permits the end of the auger assembly there supported to be lifted simply from its support.

The configuration of the intermediate support arrangement of the invention lends itself to the provision of a simple annular shield straddling the abutting ends of the central tubes of the respective auger portions to protect their respective bearings and guard against undesirable wrapping of crop material at the junction of the two auger portions. A relatively narrow annular shield may straddle the suspension members or hanger and be virtually wiped by the inner ends of functional surfaces of the respective abutting auger portions so that there is a minimum axial discontinuity in those functional surfaces. The annular shield may consist of at least two portions, including a lower portion attached adjacent a lower extremity of the suspension member or hanger and an upper portion, also carried by the suspension member but designed to be easily detachable so as to permit easy lifting of the supported auger portion end from its support at the suspension member. The detachable upper shield portion may extend over an arc of about 180 degrees and be adapted at one end to hook into the lower shield portion and be retained at its other end by a single fastener engaging the suspension member.

Another feature of the invention is that the support plate or hanger may be adjustably connected to a frame member of the header so as to permit vertical or horizontal adjustment (or combinations of adjustment) of the ends of the respective auger portions at their intermediate support so as to establish a desirable working clearance between the functional surfaces of the auger portions and, for example, an auger floor or back wall with which the conveyor auger cooperates to convey material. The nature of an intermediate bearing support according to the invention permits such adjustment to be made with no associated problems of misalignment or induction of stress in the auger portions.

BRIEF DESCRIPTION OF THE DRAWINGS

FIG. 4 is a further enlarged partial sectional view approximately on line 4—4 of FIG. 3 showing the support ledge arrangement of the central suspension member.

FIG. 5 is a view in an axial direction of a bearing and bearing plate assembly removed from the auger portion which it supports.

FIG. 6 is a partial cross-sectional view approximately on line 6—6 of FIG. 5 to illustrate the flush outer surface of the bearing plate assembly.

FIG. 7 is a view in an axial direction of the upper portion of the annular shield provided at the junction of the two auger portions.

FIG. 8 is another view of the shield portion of FIG. 7 taken approximately on line 8—8 of FIG. 3.

DESCRIPTION OF THE PREFERRED EMBODIMENT

Figure 1:
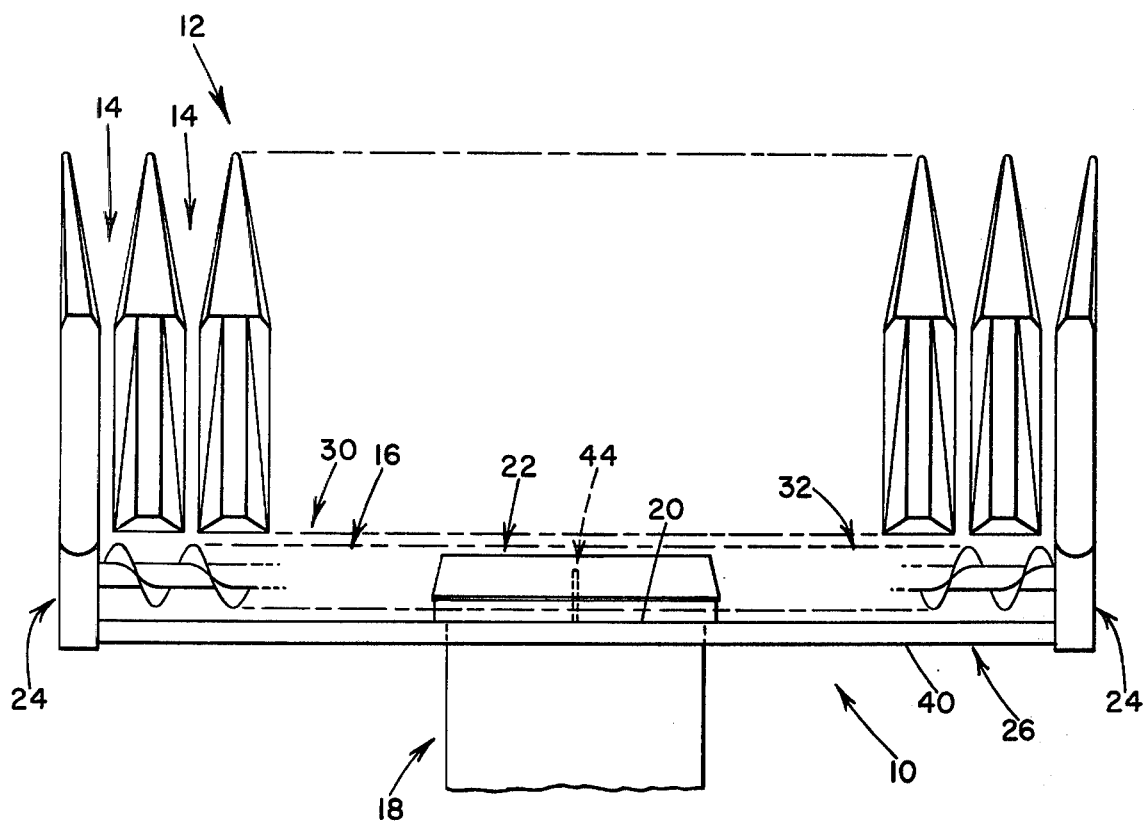
FIG. 1 is a semi-schematic overhead view of a corn head for a combine including a transverse auger conveyor arrangement embodying the invention.

An appropriate environment for the invention is in a wide harvesting header for a combine, such as the twelve row corn head shown semi-schematically in FIG. 1, but it is adaptable to other machines with similar conveyors such as windrowers.

The corn head exemplifies one of the well known forms of harvesting header and includes a main frame or body 10 carrying a plurality of side-by-side fore-and-aft extending row units 12, each having a feeding channel 14 through which, as the corn head is advanced over a field, crop material is guided and conveyed for reception by a transverse auger conveyor assembly or cross auger 16.

As is conventional, the corn head is carried on the forward end of a feeder house 18 (only the forward portion of which is shown in FIG. 1) which is pivotally supported at the forward end of a combine separator body. Crop material received by the auger conveyor 16 is conveyed and converged transversely for transfer to the feeder house through a feeder house inlet 20. Efficiency of transfer of material into the feeder house is aided, as is conventional, by a hood assembly 22 extending forwards and downwards above the auger conveyor 16 at the feeder house inlet 20. Opposite side wall assemblies 24 provide support for the opposite outer extremities of the auger conveyor assembly 16 and are connected by a rear wall assembly 26.

Figure 2:
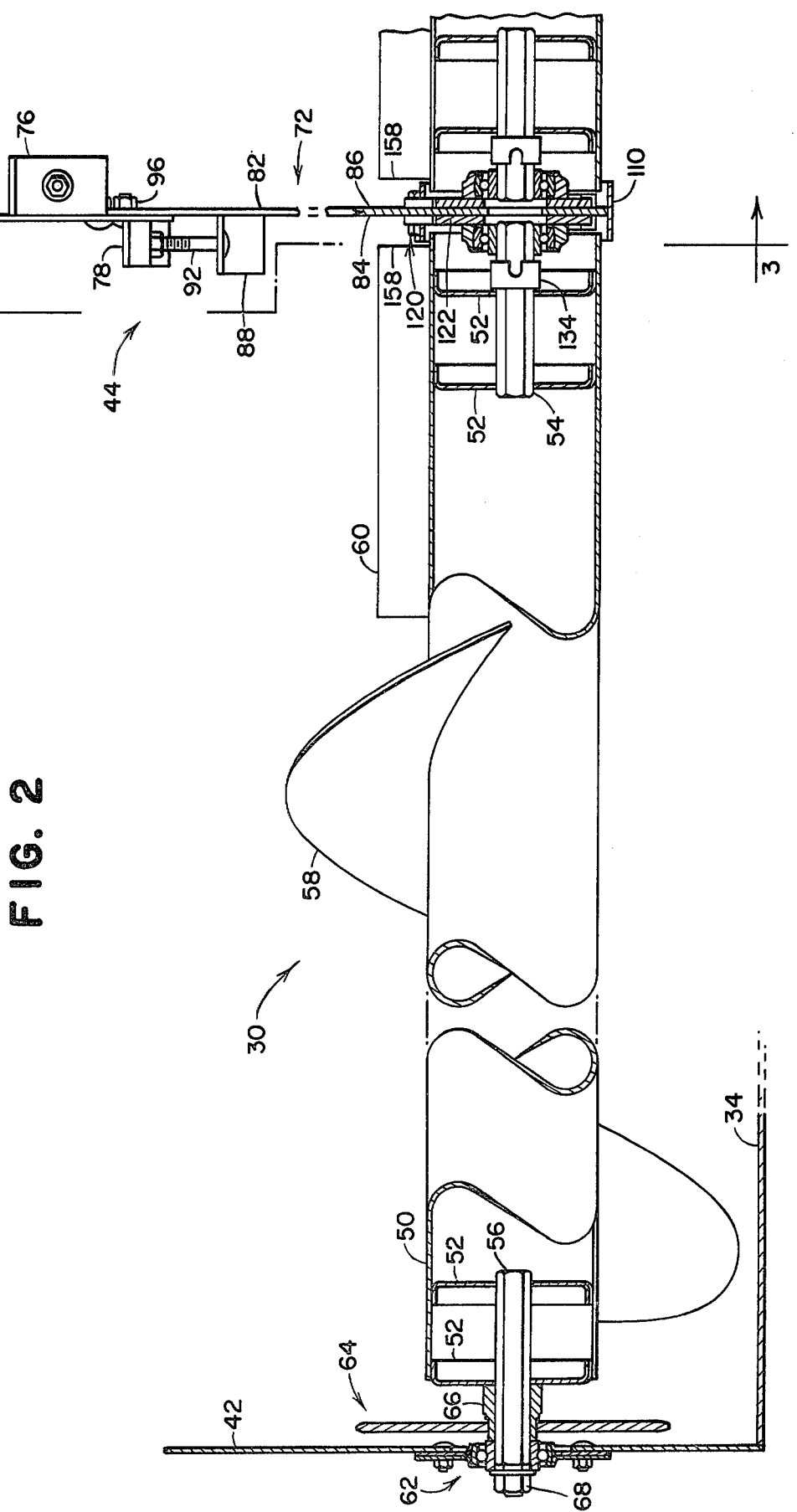
FIG. 2 is a enlarged partial cross-sectional view of the left hand portion of the auger conveyor arrangement taken on a transverse vertical plane through the axis of the auger conveyor and including a lower portion of the central support arrangement.
Figure 3:
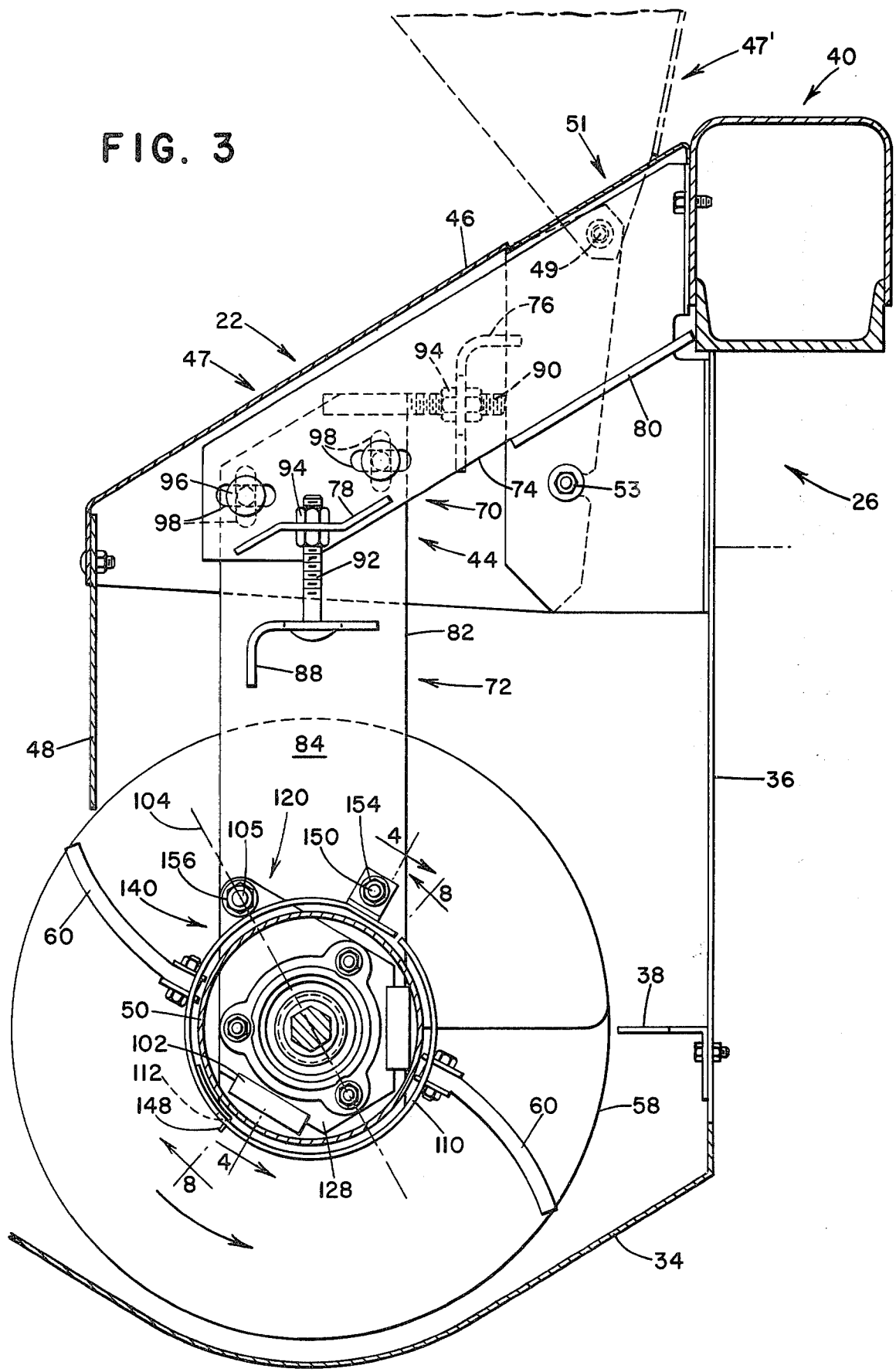
FIG. 3 is a partial view approximately on line 3—3 of FIG. 2 showing the auger support arrangement and its connection to the corn head frame.

More details of the auger conveyor assembly 16 and related parts of the corn head body 10 are shown in FIGS. 2 and 3. Opposite left and right hand auger assemblies 30 and 32 respectively, cooperate with a conveyor floor 34 and rear wall 36 (including a conventional axially extending stripper 38) to convey and converge crop material towards the feeder house inlet 20 as the auger portions rotate. The rear wall 36 and feeder house inlet shield 22 are connected to a frame member 40, substantially spanning the corn head. Each auger assembly 30, 32 is supported at its outer end in one of a pair of opposite end walls 42 included in the opposite side wall assemblies 24.

The inner ends of the auger assemblies 30, 32 are supported by a center suspension member or assembly 44 rigidly connected to the frame member 40. The center support assembly 44 is substantially covered by the hood or shield assembly 22 and, more specifically, by a forwardly and downwardly extending shield upper sheet 46 and a skirt-like lower sheet 48 forming the front part of the shield and extending downwards to closely adjacent the periphery of the rotatable auger assemblies 30 and 32. The upper and lower hood sheets 46 and 48 respectively, form part of a hinged shield portion 47, pivotally supported at each end by pivots 49 by an upper fixed shield portion 51 so that it can be raised into an access position indicated by 47' in FIG. 3. In operation, the hinged shield portion 47 is retained in the down position by a clamping fastener 53.

The opposite auger assemblies 30, 32 are similar and it is convenient to describe only one, namely the left hand assembly 30, shown in FIG. 2. It includes a core tube 50 carrying internally, adjacent each of its opposite ends, a pair of spaced apart spacers or bulkheads 52, each carrying a rigidly attached stub shaft of hexagonal cross section, inner 54 and outer 56 respectively, co-axial with the core tube 50. Conventional continuous helical flighting 58 is rigidly attached to the core tube 50 over most of its length but gives way to a pair of axially extending paddles 60 at its inner end. For simplicity, only a pair of diametrically opposed paddles is shown but in practice, additional paddles may be employed and they may be arranged with axial overlap and in a particular relationship to the end of the flighting 58 so as to improve the conveyor function in transferring crop material into the feeder house. The outer stub shaft 56 extends through and is rotatably supported in an antifriction bearing assembly 62, carried by the end wall 42. Drive input for the auger assembly 30 is by sprocket assembly 64 and a drive-chain (not shown). A hub 66 of the sprocket assembly 64, serves as a spacer between the outer auger tube bulkhead 52 and cooperates with a retaining nut 68 outside the bearing 62 to secure the auger assembly 30 against axial displacement relative to the end wall 42.

In the center support assembly or suspension member 44, an upper portion 70, rigidly connected to the frame member 40, rigidly but adjustably carries a lower portion 72 and includes a downwardly and forwardly extending arm or plate 74. On the opposite left and right hand vertical surfaces of the arm 74 are rigidly attached, respectively, an adjusting stud bracket 76 and an adjusting bolt bracket 78. A gusset plate 80 reinforces the connection of the upper arm 74 to the frame member 40.

The lower portion 72 of the center suspension member assembly 44 comprises a vertically extending plate 82 having fore-and-aft extending closely spaced left and right hand mounting or support surfaces, 84 and 86 respectively. Rigidly attached to the left hand surface 84, an adjusting bolt bracket 88 registers with the adjusting bolt bracket 78 carried by the upper arm 74. A horizontally extending adjusting stud 90 is welded to the upper extremity of the lower plate 82 and in assembly extends through the bracket 76. This stud 90, along with the adjusting bolt 92 and nuts 94, permit vertical and horizontal adjustment of the lower plate 82 relative to the upper arm or plate 74, and clamping or locking in any desired adjusted position is provided by the pairs of clamping fasteners 96 passing through the slots 98 in the upper and lower plates 74 and 82 respectively.

At the lower end of the lower suspension member portion 82 is a central hole 100 flanked on each side by a pair of support ledge pieces or sockets 102, each pair rigidly attached to the opposite support surfaces 84 and 86 respectively. Each pair of ledge pieces 102 is symmetrically arranged about a forwardly and upwardly inclined center line 104 which passes approximately through the line of centers of the hole 100 and a fastener hole 105. As best seen in FIG. 4, each ledge piece or socket 102 has a uniform cross section providing a floor 106 and a retaining lip 108.

Also rigidly attached at the lower end of the lower suspension member portion 82 and concentric with the hole 100, is a semi-circular shield portion 110, also approximately symmetrically disposed about the center line 104 and equally axially extending with respect to the opposite support surfaces 84, 86 of the lower suspension member portion 82. The shield portion 110 includes a pair of slots 112, one on each side of the lower forward portion of the lower suspension member 82 and indicated only in FIG. 3.

The inner end of the auger assembly 30 includes and is rotatably and releasably supported by means of a bearing plate assembly 120 comprising a bearing plate 122, seen best in FIG. 5, and having a central clearance hole 124 and a retainer hole 126 and a pair of support edges 128 symmetrically disposed about the line of centers of the holes 124 and 126 and matching the disposition of the floor 106 of the ledge pieces 102 relative to the center line 104. A bearing assembly, such as a conventional three hole self-aligning pillow block with hex bore 130, is mounted with its bore concentric with the central hole 124 by suitable fastening means, such as plow-head bolts 132, seen best in FIG. 6, such that the bearing plate assembly 120 presents a flush surface 133 on the side of the plate 122 opposite the bearing 130.

In assembly, a loose spacer collar 134 is threaded onto the inner stub shaft 54 after which the bearing plate assembly 120 is threaded onto the shaft with the hex bore of the bearing 130 telescopingly engaging the hex shaft 54. Before installing the auger assembly 30 in the corn head, the hood assembly hinged portion 47 is raised into position 47', where it is stably supported by the frame member 40, providing unobstructed access to the auger intermediate support area and in particular, the suspension assembly 44. The auger outer end may then be engaged through and loosely supported by the end wall 42 after which the inner end is brought into alignment by moving it downwardly and rearwardly, so that the support edges 128 of the bearing plate 122 engage the floors 106 of the ledge pieces or socket 102 and the retainer hole 126 of the plate 122 registers with the fastener hole 105 in the lower suspension member 82. The flush surface 133 of the bearing plate assembly 120, bears against the support surface 84 of the lower suspension member 82 so that the support edges 128 bear against the floor portions 106 and axial movement of the plate assembly 120, with respect to the lower member 82, is limited by engagement of the plate 122 with the ledge piece lips 108.

The telescoping engagement of the hex stub hex shaft 54 with the bearing plate assembly 120, provides that some variations in relative axial dimensions due to manufacturing variations and tolerances, can be accommodated without imposing axial loads on the auger assembly 30 or the central suspension assembly 44. However, the collar 134 serves as a limiting spacer to ensure that the rotating auger tube 50 cannot bear against the bearing plate 122.

With both auger assemblies in place (right hand auger assembly 32 is assembled in a similar manner), the upper portion 140 of the annular shield may be assembled. It includes an approximately semi-circular shield member 142 with a central notch 144 in its rearward half to clear the lower suspension member 82 and the upper portions of the opposite bearing plates 122. Spot welded to its forward end is a retaining tab 146 having a pair of side-by-side tangs 148 for hooking into engagement with the slots 112 in the fixed portion of the shield 110. The shield upper portions 140 is retained by a fastener 150 passing through a pair of clips 152 rigidly attached to the shield member 142 on opposite sides of the notch 144 and a corresponding hole 154 in the lower plate 82. When assembled, the shield upper portion 140 cooperates with the fixed shield lower portion 110 to form an annular shield approximately concentric with the inner ends of the auger assemblies and axially and protectively overlapping the inner ends of the auger tubes 50 and the bearings 130, as best seen in FIG. 2. Next, the auger portions 30, 32 are locked in position by inserting and tightening a suitable fastener 156 through the aligned holes 126, 105 in the bearing plate 122 and lower suspension member 82 respectively. Clearances between the auger flighting 50 and the cooperating conveying surfaces (34, 38) are simply adjusted by manipulation of the adjusting take up elements (90, 92, etc.). As there is no direct connection or axial alignment-limiting element between the two auger portions, and particularly between the auger tubes (50) or inner stub shafts (54), such adjustment, to optimize function, may be made without inducing damaging stresses in tubes and shafts.

As can be seen in FIG. 2, after assembly and in operation the paddles 60 closely "wipe" the annular shield (140, 110) and the small axial spacing between the inner ends 158 of the paddles 60 of the adjacent auger portions 30, 32 constitutes a minimum axial interruption of the functional surfaces of the augers.

For disassembly, of one auger portion independently if so desired, it is only necessary to raise the hood portion 47, loosen the outer support of the auger portion at end wall 42, remove the locking fastener 156, remove the annular shield upper portion 140 and lift the auger portion, inner end first, upwards and forwards from the header.

I claim:

1. In a mobile harvesting machine having a header including an elongated transversely extending gatherer with a rear wall having a discharge opening and a rear frame member and, generally contiguous with and extending forwardly from the rear wall, opposite ends walls and a floor, an improved auger conveyor assembled so as to span the gatherer between the end walls and closely spaced above and forward of the floor and rear wall respectively comprising:

first and second auger assemblies approximately coaxially aligned, each having an outer end rotatably supported in an end wall and an inner end including support means for rotatably and releasably supporting said inner end, the respective auger assemblies being disposed so that the support means of their inner ends are closely adjacent to one another;

a suspension member rigidly connected to the rear frame member and extending generally downward to terminate adjacent the support means of the inner ends of the respective auger assemblies and having socket means such that, during assembly, the socket means engage the respective support means of the inner end of each auger assembly upon movement of each said inner end alongside the suspension member in a direction approximately perpendicular to the axis of the assembled conveyor and so that each auger assembly inner end is independently supported by the suspension member; and means for rotatably driving each auger assembly.

2. The conveyor of claim 1 wherein the suspension member is interposed between the closely adjacent support means of the respective auger assembly inner ends and said support means are spaced and separated by the suspension member.

3. The conveyor of claim 1 wherein each auger assembly includes adjacent its inner end, a generally radially extending paddle in a crop material delivery relationship with the gatherer discharge opening and the auger assembly includes helical flighting such that as the auger assembly rotates, it cooperates with the floor and rear wall of the gatherer to convey crop material towards the inner end for engagement by the paddle and the juxtaposed paddles of the respective first and second auger assemblies both impel crop material through the discharge opening.

4. The conveyor of claim 1 wherein the suspension member is disposed adjacent the discharge opening and further including a hood assembly pivotally supported by the rear frame member and extending forwardly and downwardly over an upper portion of the discharge opening and the suspension member.

5. The conveyor of claim 1 wherein the auger inner end support means includes a bearing plate having a fore-and-aft extending flush surface and the suspension member includes a pair of opposite fore-and-aft extending closely spaced support surfaces, and the socket means includes, carried on each support surface, raised ledge means for engaging and supporting an auger inner end bearing plate.

6. The conveyor of claims 5 wherein each ledge means includes a retaining lip for engaging the bearing plate so as to limit its axial movement relative to the suspension member.

7. The conveyor of claim 6 wherein the suspension member carries a locking device for engaging the bearing plates of the first and second auger assemblies and cooperating with the ledge means so that the inner ends of the respective assemblies are secured in fixed relationship to the suspension member.

8. The conveyor of claim 7 wherein each auger assembly includes an axial core tube and the locking device is disposed radially outside said tube.

9. The conveyor of claim 6 wherein the supporting ledges of the suspension member are disposed to facilitate disassembly of each auger assembly from the gatherer by permitting free movement of the inner end of each auger assembly in a generally forward and upward direction away from the suspension member.

10. The conveyor of claim 1 wherein the support means of the inner end of each auger assembly includes a generally fore-and-aft extending bearing plate having opposite sides and carrying, on one of its sides, a bearing assembly and the auger assembly includes auger flighting carried on a tube and the inner end of the tube carries means for engaging the bearing assembly for rotatably supporting the inner end of the auger assembly and the auger tube extends over and shields the bearing assembly and terminates closely adjacent the bearing plate.

11. The conveyor of claim 10 wherein no part of the socket means of the suspension member is with respect to each auger axis disposed radially outside of a circle equivalent to the inside diameter of the respective auger tubes and centered on the auger axes.

12. The conveyor of claim 10 wherein the means for engaging the bearing assembly includes a stub shaft carried concentrically by the inner end of the auger tube and extending axially so as to telescopingly engage the bearing assembly.

13. The conveyor of claim 10 and further including an annular shield carried by the suspension member closely surrounding and axially overlapping the inner ends of the respective auger tubes.

14. The conveyor of claim 13 wherein the annular shield includes a detachable upper portion so as to facilitate disengagement of the inner end of each auger assembly from the suspension member and a lower portion attached rigidly to the suspension member.

15. The conveyor of claim 14 wherein the shield detachable portion at least partially embraces the suspension member, and includes as means for fixing its position relative to the suspension member, a hook arrangement at one end for engaging an end of the shield fixed portion and a bracket at the other end for securing it to the suspension member.

16. The conveyor of claim 1 wherein the support means of the inner end of each auger assembly includes a fore-and-aft extending bearing plate and a self-aligning anti-friction bearing rigidly attached to one side of the bearing plate so that in assembly, the respective bearing plates are closely axially spaced and disposed substantially between the bearings of the respective auger assemblies.

17. The conveyor of claim 1 wherein the suspension member comprises an upper portion rigidly connected to the gatherer rear frame member and a lower generally vertically extending portion and means connecting the two portions for providing both vertical and fore-and-aft adjustment of the inner ends of the auger assemblies.

18. The conveyor of claim 1 wherein the support means of the inner end of each auger assembly includes a bearing and further including a shield, carried by the suspension member, surrounding and extending axially over each bearing means.

19. An auger conveyor arrangement for a transversely extending gatherer of a mobile harvesting machine, the gatherer including an end wall and a generally fore-and-aft extending support surface remote from the wall comprising:

an auger assembly having opposite first and second ends, the first end being rotatably and releasably supported by the end wall;

a bearing plate assembly including on one side a bearing assembly for receiving and rotatably supporting the second end and having on its opposite side, a flush fore-and-aft extending surface for abutting the support surface of the gatherer; and socket means carried by the gatherer support surface for engaging the bearing plate assembly and maintaining it in a fixed relationship to the support surface.

20. The auger conveyor arrangement of claim 19 and further including means for rotatably driving the auger assembly connected to the first end.

* * * * *